Figure 1:
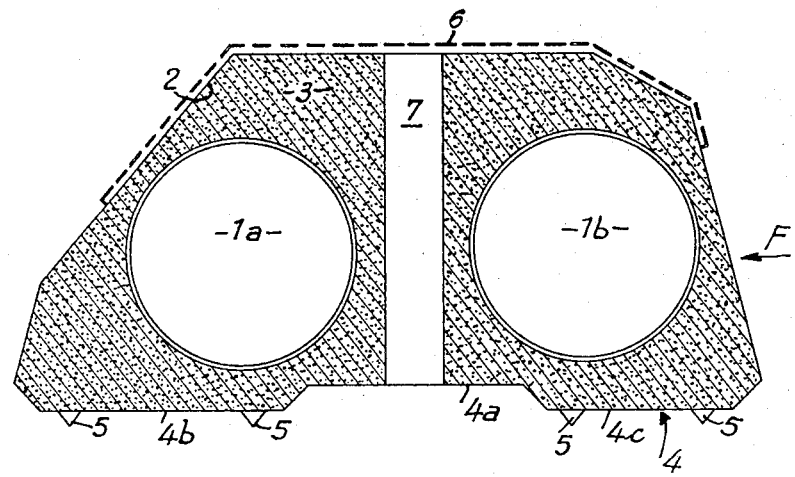

June 20, 1967   J. E. LAMY   3,326,000

IMMERSED PIPE STRUCTURE

Filed Sept. 27, 1963

3,326,000
IMMERSED PIPE STRUCTURE
Jacques Edouard Lamy, Fontenay-aux-Roses, France, assignor to Societe d'Etude du Transport et de la Valorisation des Gaz Naturels du Sahara S.E.G.A.N.S., Paris, France, a corporation of France
Filed Sept. 27, 1963, Ser. No. 312,177
Claims priority, application France, Oct. 8, 1962, 911,540
5 Claims. (Cl. 61—1)

The present invention relates to submarine pipes likely to be subjected to transverse currents and more particularly to pipes laid on the bed of the sea, a river or lake.

The forces which act on an immersed pipe of any shape placed on the sea bed and subjected to the action of a transverse current, exert on the pipe, on the one hand, a force which tends to cause the pipe to slide on the sea-bed, and on the other hand, a tilting force which tends to tip the pipe over. The hydrodynamic forces can be reduced to a vertical force or lifting force and a horizontal or drag force which tends to cause the pipe to slide in the direction of the current. If the current is strong enough, and depending on the weight of the pipe, the latter can slide or tilt.

The object of the present invention is to provide a process for modifying the forces acting on an immersed pipe subjected to transverse currents so as to reduce, or even eliminate, the risk of sliding or tilting.

The process according to the invention comprises modifying the outer shape of the pipe, or pipes, by placing the pipe or pipes within a protective casing having a certain rigidity, and a geometric shape which is so chosen as to impart thereto a profile which has as little lift and/or drag as possible, and acting on the state of the outer surface of said casing in such manner that the condition of the exterior pressures on said casing is modified in a direction tending to decrease the lift.

Another object of the invention is to provide a protective casing for carrying out the aforementioned process and permitting in particular, the modification of the condition of the pressures in the aforementioned direction, said casing comprising one or more vents which put the extrados and intrados of the casing in communication with each other so as to decrease the pressure gradient between said two surfaces.

Said casing has preferably a polygonal profile, for example trapezoidal, the large base resting on the bed.

According to another feature of the invention, the extrados has a roughness which creates a preturbulence which tends to shift in the upstream direction the point at which the liquid streamlines break away and consequently decreases the negative pressures on the extrados located on the downstream side of the break-away point.

The stability of the whole can be improved by the addition, on the lower face of the casing resting on the bed, of recesses and/or projections which tend to prevent or reduce any possible sliding on the bed.

The advantage of the vents according to the invention is that they reduce the subpressures in all cases in which the latter can arise, such as: a pipe which is more or less transversely inclined on the bed, formation of holes on the upstream side under the effect of erosion, start of tilting etc. Tests carried out have shown that the maximum speed of the current creating the tilt can be in this way increased by at least 30%. The dimensions and positions of the vents are determined in bearing in mind the constructional requirements of the whole of the pipe or pipes and casing. In the case of two pipes enclosed in side-by-side relation in the same casing, the vents are advantageously formed in the interval between the two pipes. The general shape of the vents has an influence on their effectiveness. Thus, their ends could be flared.

The desired roughness according to the invention can be obtained by different means, for example: metal lattice, bars or plates suitably welded to the surface and more generally any other means creating a turbulence.

Further features and advantages of the invention will be apparent from the ensuing description, with reference to the accompanying drawing to which the invention is in no way limited.

Figure 2:
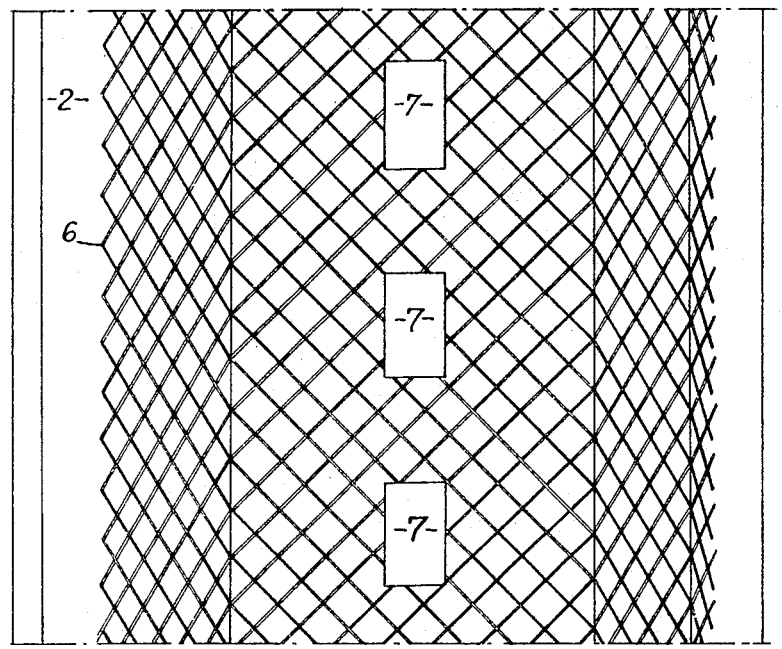

In the drawing:

FIG. 1 is a diagrammatic cross-sectional view of two submarine pipes surrounded by a casing, the assembly resting on the bed of the sea, for example, and FIG. 2 is a diagrammatic top plan view of a portion of the casing.

According to the illustrated embodiment, two pipes 1a, 1b are disposed within a protective casing 2 of special shape, with interposition of a suitable filling material 3, the casing 2 and filling material 3 constituting an outer element. The profile of the casing 2 has the general shape of a trapezium whose large base, or intrados 4—which rests on the bed of the sea (not shown)—has a central portion 4a which is set back relative to the lateral portions 4b, 4c which act as supports and are provided with projections or spade portions 5. The extrados of the casing is rendered rough by means of a strip 6 of metal lattice which covers the small base and the upper portion of the sides of the trapezoidal profile.

Passages or vents 7 disposed between the two pipes 1a, 1b put the intrados and extrados of the protective casing in communication with each other.

These various arrangements impart high stability to the assembly of the pipe and casing under the action of transverse currents, such as F.

Although specific embodiments of the invention have been described, many modifications and changes may be made therein without departing from the scope of the invention as defined in the appended claims.

Thus the invention is applicable in the case where the installation comprises only a single pipe, which would not, properly speaking, be inclosed in a protective casing but would have the outer features according to the invention.

Having now described my invention what I claim as new and desire to secure by Letters Patent is:

1. Pipe structure for decreasing the action of cross currents on a pipe immersed in a body of water overlying a bed, said pipe resting on the bed, said structure comprising in combination, a pipe and a rigid outer element surrounding and enclosing said pipe, said element having a bottom face for resting on said bed, said bottom face having a recess, a top face and upwardly converging side faces, and permanent throughway passage means in said element in spaced relation to said pipe and putting said recess in said bottom face in communication with said top face.

2. Pipe structure as claimed in claim 1, further comprising turbulence creating elements attached to a portion of the top and the side faces of said outer element which includes said top face to create preturbulence of said body of water which shifts in the upstream direction of said cross currents the points at which the streamlines of said water break away.

3. Pipe structure for decreasing the action of cross currents on a pipe immersed in a body of water overlying a bed, said pipe resting on the bed, said structure comprising in combination, a pipe and a rigid outer element surrounding and enclosing said pipe, said element having a bottom face for resting on said bed, a top face and upwardly converging side faces, and a metal lattice spaced from and fixed to a portion of the top and side faces of said outer element.

4. Pipe structure comprising in combination two pipes in transversely spaced relation, a rigid outer element surrounding said pipes and having a generally trapezoidal cross-sectional shape and comprising a bottom face corresponding to the base of said trapezoidal shape, said bottom face having a recess, a top face and upwardly converging side faces and permanent throughway passages in said element between said pipes putting said bottom face and the recess in the top face in communication with each other.

5. Pipe structure comprising in combination two pipes in transversely spaced relation, a rigid outer element surrounding and enclosing said pipes and having a generally trapezoidal cross-sectional shape and comprising a bottom face corresponding to the base of said trapezoidal shape, a top face and upwardly converging side faces, and a lattic spaced from and fixed to a portion of the top and the side faces, said element including said top face to render said portion rough and create preturbulence of a current of liquid in which said structure is intended to be placed.

References Cited

UNITED STATES PATENTS

| 288,033 | 11/1883 | Detrick | 61—43 X |
| 736,507 | 8/1903 | Dunham | 61—43 |
| 2,211,589 | 8/1940 | Widmer | 61—42 |

FOREIGN PATENTS

| 370,399 | 1906 | France. |
| 101,711 | 1962 | Netherlands. |

OTHER REFERENCES

Engineering News Record, Feb. 25, 1960, p. 64.

CHARLES E. O'CONNELL, *Primary Examiner.*

JACOB SHAPIRO, *Examiner.*